D. MYERS.
Car Brake.

No. 39,306.

2 Sheets—Sheet 1.

Patented July 21, 1863.

Witnesses

Inventor:

D. MYERS.
Car Brake.

No. 39,306.

2 Sheets—Sheet 2.

Patented July 21, 1863.

Witnesses:

Inventor:

AM. PHOTO-LITHO. CO. N.Y. (OSBORNE'S PROCESS.)

UNITED STATES PATENT OFFICE.

DAVID MYERS, OF SOUTH BEND, INDIANA.

IMPROVEMENT IN RAILROAD-CAR BRAKES.

Specification forming part of Letters Patent No. 39,306, dated July 21, 1863.

*To all whom it may concern:*

Be it known that I, DAVID MYERS, of South Bend, in the county of St. Joseph and State of Indiana, have invented certain new and useful Improvements in Operating Railroad-Car Brakes; and I do hereby declare that the following is a full, clear, and exact description of the same, reference being had to the accompanying drawings, making a part of this specification, in which—

Figure 1:
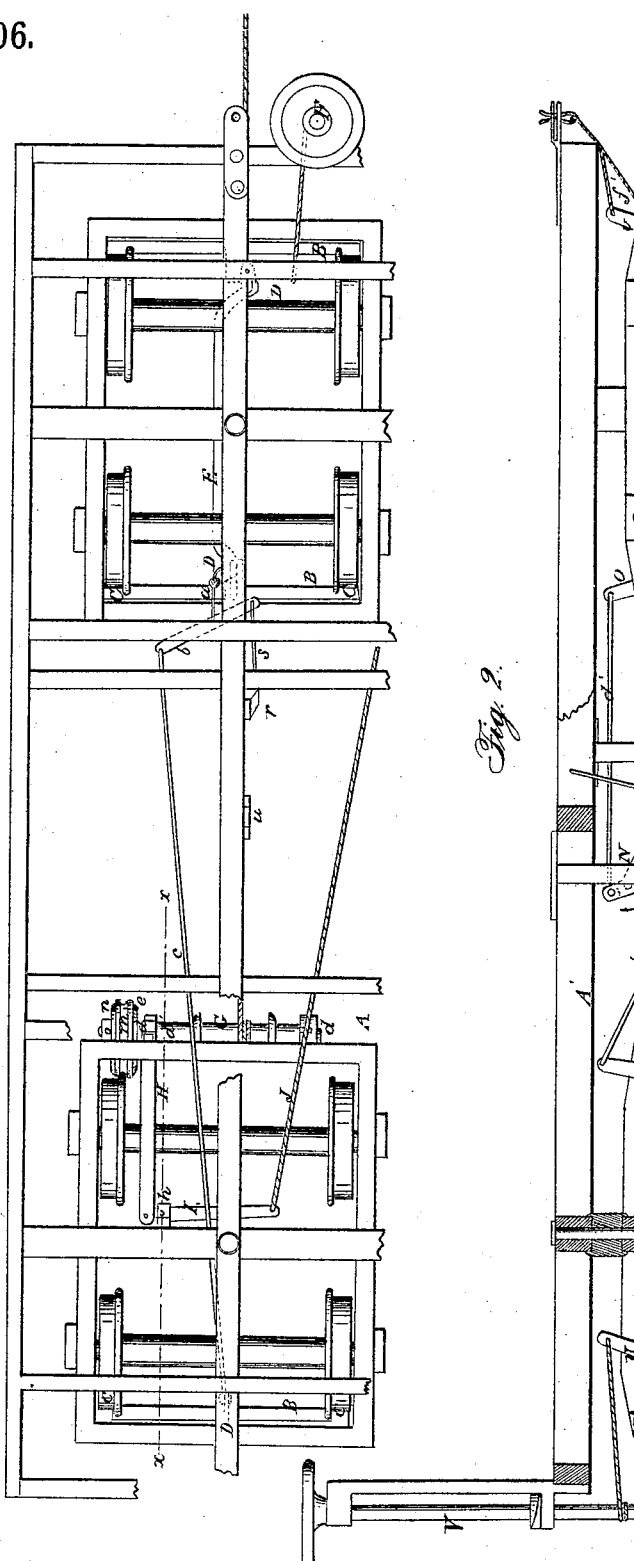
Figure 2:
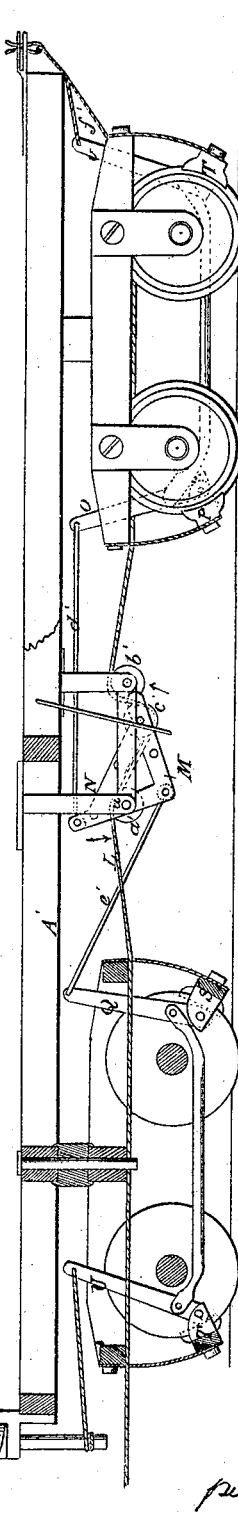
Figure 3:
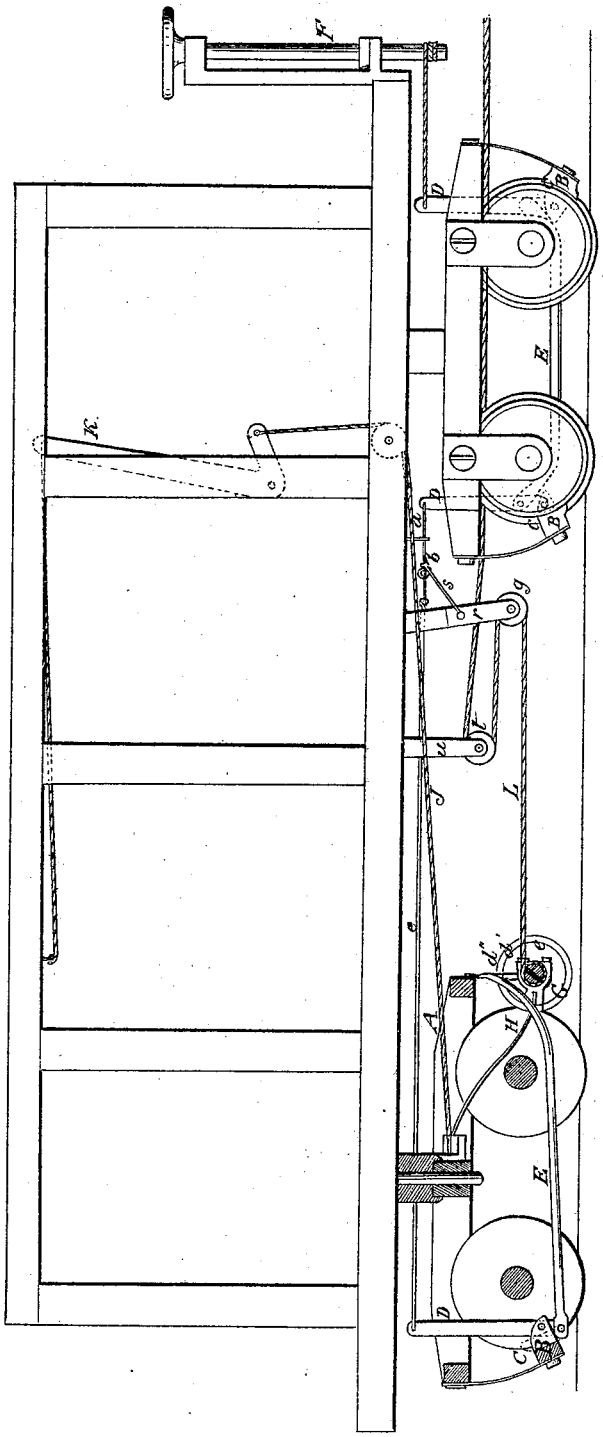
Figure 3:

Figure 1 is a plan or top view of the running-gear of a baggage-car with my improvement applied to it; Fig. 2, a side sectional view of the running-gear of a passenger-car with my improvement applied to it; Fig. 3, a side sectional view of a baggage-car, as shown in Fig. 1, $x\ x$ indicating the line of section; Fig. 4, detached views of a friction-wheel pertaining to the invention.

Similar letters of reference indicate corresponding parts in the several figures.

This invention relates to an improvement in operating the ordinary hand-brakes; and it consists in a novel and simple arrangement of parts whereby all the brakes of a train of cars may be operated simultaneously and by a single manipulation on the part of the attendant.

In carrying out this invention, a friction-wheel is employed for turning a shaft, which winds up a continuous chain, the latter being connected with the brake-rods in such a manner as to apply the brakes to the wheels, the brakes at the same time being capable of being operated by hand in the usual way when necessary or required. The friction-wheel is constructed and arranged in a novel way, so as to preserve the car-wheel which rotates it from injury by wear, and at the same time prevent the brakes or any of their parts being injured by any undue strain or tension.

To enable those skilled in the art to fully understand and construct my invention, I will proceed to describe it.

A, Figs. 1 and 3, represents the trucks or running-gear of a baggage-car, or the car directly behind the locomotive or the tender thereof.

B represents the brake-bars, and C the shoes. These brake-bars are suspended from the trucks in the usual way, each brake-bar having a lever, D, connected to it, the two levers of each truck connected by a rod, E, and the innermost lever of one truck connected by a rod, $a$, with a lever, $b$, one end of which is connected by a rod, $c$, with the outermost lever of the other truck, as shown more particularly in Fig. 1. This arrangement is substantially the same as the brake mechanism in common use, and it may be connected to the usual hand-rods, F, in the ordinary way, as shown clearly in Figs. 1 and 3.

G represents a shaft, which is fitted in pendent bearings $d\ d'$, attached to one of the trucks A of the baggage-car. The bearing $d$ is a fixed one, but the bearing $d'$ is a yielding one, it being attached to a spring or an elastic pendant, $d''$. This shaft G has a circular collar or boss, $e$, formed on it or permanently attached to it, and there is also a hub, $f$, on the shaft, provided with a longitudinal feather or rib, $g$, on which a collar, $h$, is fitted, the feather or rib $g$ fitting in a groove, $i$, in the collar. This collar $h$ has its periphery notched, as shown at $j$, in order to receive projections $k$ of circular disks $l$, (three or more,) which are fitted on the collar $h$. These disks $l$ turn with the collar, and the latter turn with the hub $f$ and shaft G. (See Fig. 4.)

On the disks $l$ there is fitted a ring, $m$. This ring has a grooved periphery, and it is fitted snugly on the disks, but is allowed to turn thereon at certain times, as will be presently shown. The ring is rather larger in diameter than the boss $e$, and on the shaft G there is fitted loosely a collar or boss, $n$, which is made to pass against the collar $h$ and boss $n$, by means of a nut, $o$. By this arrangement it will be seen that the ring $m$ may be made to turn more or less freely, as desired.

H is an arm, which is attached to the shaft G near the collar or boss $e$. The outer end of this arm is connected to one end of a lever, I, the fulcrum-pin $p$ of which is attached to the truck to which the shaft G is connected. The opposite end of this lever has a chain, J, attached to it, which is connected to a lever, K, in the baggage-car. (See more particularly Fig. 3.)

L is a chain, which is attached to the shaft G, and passes around a pulley, $q$, in a pendant, $r$, attached to the bed or bottom of the baggage-car. This pendant is allowed to swing loosely, and it is connected by a rod, $s$, to the end of the lever $b$, which is opposite to the end where the brake-rod $a$ is attached. The chain also passes around a fixed pulley, $t$, in a pendant, *u*, attached to the car-bed, and then passes along to the rear car, and is connected to the brakes thereof in a manner hereinafter shown. By this arrangement it will be seen that if the lever K is actuated so as to operate the lever I and draw the ring *m* in contact with the flange of a truck-wheel, which is in line with it, the shaft G will be rotated, and the chain L wound upon it, and the lever *b* actuated so as to "put on the brakes," or cause the shoe C to pass against the peripheries of the car-wheels. The shaft G is rotated from the ring *m*, in consequence of the friction produced by said ring in fitting on the disks *l*, and being clamped between the two bosses; but when the brakes are fully brought up—that is to say, when the shoes C are made to press sufficiently hard against the wheels—the ring *m* will turn on the disks *l*, and hence the rods of the brake will not be subjected to any undue tension, and the ring *m* in thus being allowed to turn will prevent the flange of the car-wheel from being worn by friction. In fact, both the ring *m* as well as the flange of the wheel will be preserved from wear. By employing a plurality of disks, *l*, the position of the central one, or any one of them, may be changed from time to time, so as to preserve their circular form. The chain L, when wound upon the shaft G, is made to actuate the lever *b* in consequence of passing around the pulleys *q t*, as shown clearly in Fig. 3, the pendant *r* being moved by this means and the rod *s* actuating the lever *b*. The chain L is a continuous one—that is to say, it extends along the whole length of the train, and is attached to the rear end of the rear car thereof, as shown at *v* in Fig. 2. The passenger cars A', or all cars in the rear of the baggage-car, has a triangular-shaped lever, M, suspended underneath it. The shape of this lever is shown clearly in Fig. 2. It is suspended in a small pendent frame, N, by a fulcrum-pin, *w*, which also serves as the axis of a pulley, *a'*, the latter being at one end of the frame N, and a pulley, *b'*, at the opposite end. The lower end of the lever M also has a pulley, *c'*, fitted in it, and the upper end of said lever is connected by a rod, *d'*, to the lever O of the inner brake-bar, P, of one of the trucks of the car A', while the lower end of the lever M is connected by a rod, *e'*, to the lever Q of the inner brake-bar, S, of the other truck of the car A'. The outer brake-bars, T T, of both trucks are each provided with a lever, U, one of which is connected to the car-bed by a chain, as shown at *f'*, and the other connected by a chain to the hand-rod V, as shown clearly in Fig. 2. By this arrangement it will be seen that when the chain L is actuated, and the brakes of the baggage-car applied, the levers M of all the rear cars—that is to say, all the cars behind the baggage-car—will be actuated, in consequence of the chain L passing around the pulleys *a' b' c'*, as shown in Fig. 2, said movement of the levers being in the direction indicated by the arrows, and causing, through the medium of the rods *d' e'*, the brakes to be applied to the wheels of the cars. Thus it will be seen that by this simple arrangement the brakes of all the cars comprising a train may be operated or applied simultaneously, and without any material modification of the ordinary hand-brake.

The invention may be applied to cars provided with the ordinary brakes without at all interfering with their usual mode of manual operation, when the same is necessary—as, for instance, in breaking up detached cars which have been switched off on a turn-out or branch track.

I would remark that when the shaft G is relieved from the pull of the chain J the friction-wheel will be thrown out free from the car-wheel with which it was in contact, by means of the spring or elastic pendant *d''*, and I would also remark that the triangular levers M, when relieved from the pull of the chain L, also fall to their original position by their own gravity.

Having thus described my invention, what I claim as new, and desire to secure by Letters Patent, is—

1. The friction-wheel, constructed of a ring, *m*, and a plurality of disks, *l*, fitted on a shaft, G, substantially as shown, in connection with the levers *u r*, pulleys *t q*, and cord L, arranged to operate substantially as and for the purpose herein set forth.

2. The combination, on the baggage or front car, of the fixed pulley *t*, and the pulley *q* in the swinging pendant *r*, the latter being connected to the lever *b* by a rod, *s*, and all arranged to operate in connection with the chain L, as and for the purpose set forth.

3. The triangular lever M, applied to the rear cars, and provided with the pulleys *a' b' c'*, and arranged in connection with the chain L, to operate as and for the purpose specified.

DAVID MYERS.

Witnesses:
WM. H. MILLER,
J. B. BROWNFIELD.